US006353832B1

United States Patent
Acharya et al.

(10) Patent No.: US 6,353,832 B1
(45) Date of Patent: Mar. 5, 2002

(54) SELECTIVITY ESTIMATION IN SPATIAL DATABASES

(75) Inventors: Swarup Acharya, New Providence; Viswanath Poosala, Highland Park; Sridhar Ramaswamy, Scotch Plains, all of NJ (US)

(73) Assignee: Lucent Technologies INC, Murray Hill, NJ (US)

(*) Notice: Subject to any disclaimer, the term of this patent is extended or adjusted under 35 U.S.C. 154(b) by 0 days.

(21) Appl. No.: 09/310,079

(22) Filed: May 11, 1999

(51) Int. Cl.$^7$ .............................................. G96F 17/00
(52) U.S. Cl. ........................................ 707/104; 707/5
(58) Field of Search ................................ 707/1–5, 100, 707/101

(56) References Cited

U.S. PATENT DOCUMENTS

| | | | | |
|---|---|---|---|---|
| 5,701,467 A | * | 12/1997 | Freeston | 707/100 |
| 5,724,573 A | * | 3/1998 | Agrawal et al. | 707/6 |
| 5,761,652 A | * | 6/1998 | Wu et al. | 707/2 |
| 5,781,906 A | * | 7/1998 | Aggarwal et al. | 707/102 |
| 5,963,956 A | * | 10/1999 | Smartt | 707/104 |
| 6,003,029 A | * | 12/1999 | Agrawal et al. | 707/7 |
| 6,003,036 A | * | 12/1999 | Martin | 707/102 |
| 6,052,689 A | * | 4/2000 | Muthukrishnan et al. | 707/101 |
| 6,065,007 A | * | 5/2000 | Muthukrishnan et al. | 707/7 |
| 6,092,072 A | * | 7/2000 | Guha et al. | 707/101 |
| 6,154,746 A | * | 11/2000 | Berchtold et al. | 707/100 |
| 6,175,829 B1 | * | 1/2001 | Li et al. | 707/3 |

OTHER PUBLICATIONS

Acharya et al. "Selectivity Estimation in Spatial Databases", Proceedings of the 1999 ACM SIGMOD Internation Conference on Management of Data , May 31–Jun. 3, 1999, pp. 13–24.*

Belussi et al. "Self–Spatial Join Selectivity Estimation Using Fractal Concepts", ACM Transactions on Information Systems, vol. 16, No. 2, Apr. 1998, pp. 161–201.*

(List continued on next page.)

*Primary Examiner*—Jean R. Homere
*Assistant Examiner*—Luke S. Wassum
(74) *Attorney, Agent, or Firm*—Walter J. Tencza, Jr.

(57) ABSTRACT

The present invention provides various methods and apparatus for providing accurate estimates for point and range queries over two-dimensional rectangular data. However, the techniques of the present invention for rectangular data can be applied to data of other shapes, point data, or linear data. The present invention provides several grouping techniques for the approximating of spatial data. A method is disclosed for grouping a plurality of spatial inputs into a plurality of buckets. In one form of the present invention the plurality of spatial inputs, is grouped based on an equi-area partitioning technique. The equi-area partitioning technique can use the longest dimension of a bucket or bounding polygon as the criteria for splitting into further buckets or bounding polygons. An equi-count technique can also be used wherein the buckets are split using the highest projected spatial input count along a dimension as a splitting criteria. The bounding polygons may be minimum bounding rectangles. In one form of the present invention a method is provided which uses a grid of regions superimposed over a plurality of spatial inputs. The method can determine a measure of the density of the spatial inputs within each region of the grid of regions and uses this measurement of density to determine how to group the spatial inputs into buckets. When a query is received the present invention applies the query to the buckets created by whatever method and gives an estimate of the number of spatial inputs contained within the query by preferably assuming that spatial inputs are uniformly distributed within each bucket.

10 Claims, 9 Drawing Sheets

OTHER PUBLICATIONS

Poosla et al. "Improved Histograms for Selectivity Estimation of Range Predicates", Proceedings of the 1996 ACM SIGMOD International Conference on Management of Data, Jun. 3–6, 1996, pp. 294–305.*

Samet, Hanan, The Design and Analysis of Spatial Data Structures, Reading:Addison–Wesley, 1989, pp. 92–115.*

Piatetsky–Shapiro et al., "Accurate Estimation of the Number of Tuples Satisfying a Condition", Proceedings of the 1984 ACM SIGMOD Conference, 1984, pp. 256–276.*

Kooi, Robert Phili. The Optimization of Queries in Relational Databases, PhD Dissertation, Case Western University, 1980, pp. 83–108.*

Piatetsky–Shapiro et al. "Accurate Estimation of the Number of Tuples Satisfying a Condition", Proceedings of the 1994 ACM SIGMOD Conference, 1984, pp. 256–276.*

Kooi, Robert Phili, "The Optimization of Queries in Relational Databases", PhD Dissertation, Case Western University, 1980, Chapter 6 Histograms, pp. 83–108.*

Prior Art—Alberto Bellussi, Christos Faloutsos, "Estimating the Selectivity if Spatial Queries Using the 'Correlation' Fractal Dimension", Feb. 24,1995, pp. 1–26.

Prior Art—Norbert Beckmann et al, "The R–tree: An Efficient and Robust Access Method for Points and Rectangles", 1990, pp. 322–331.

Prior Art—Antonin Guttman, "R–Trees: A Dynamic Index Structure Spatial Searching", 1984, pp. 125–135.

Yannis E. Ioannidis, Viswanath Poosala, "Balancing Histogram Optimality and Practicality for Query Result Size Estimation", pp. 5–10. (Not sure if this is prior art and there is no date).

* cited by examiner

THE FOURHORN DATASET

EQUI-AREA PARTITIONING

EQUI-COUNT PARTITIONING 50 x 50 REGIONS ON THE FOURHORN DATASET

SPATIAL DENSITIES OF THE REGIONS

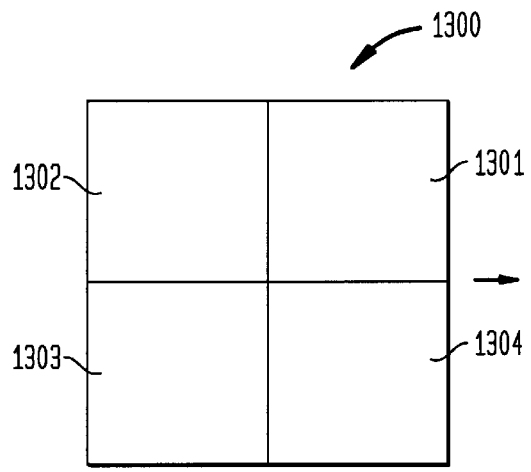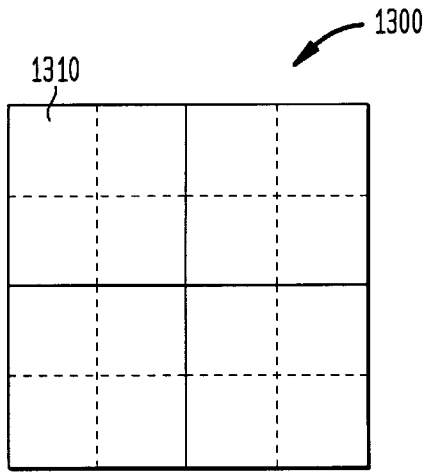
FIG. 12A
DATA WITH FOUR REGIONS
FIG. 12B
DATA AFTER REFINEMENT, WITH SIXTEEN REGIONS
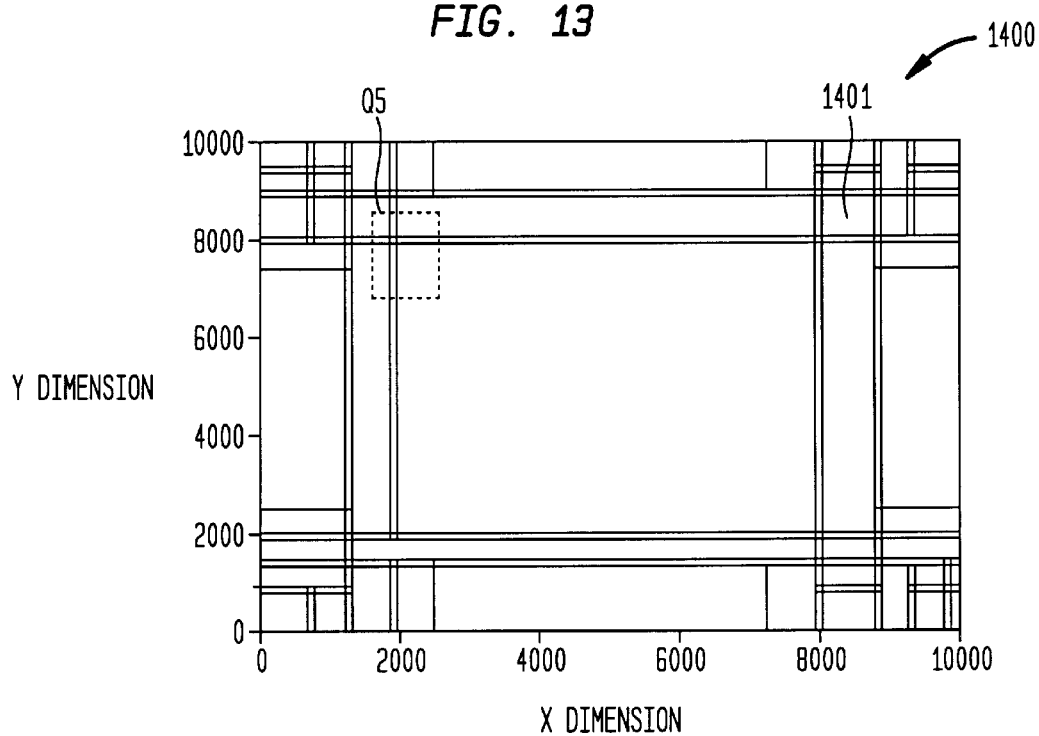
FIG. 13

SELECTIVITY ESTIMATION IN SPATIAL DATABASES

FIELD OF THE INVENTION

This invention relates to geographic information systems.

BACKGROUND OF THE INVENTION

Various geographic information systems are known in the art. These systems generally store and manage spatial data such as points, lines, poly-lines, polygons, and surfaces and hence are often referred to as spatial databases. Several commercial database systems that manage spatial data are now available, including: ESRI's (Environmental Systems Research Institute), ARC/INFO (trademarked), InterGraph's MGE, MapInfo, and Informix. Query size estimation in spatial databases has been identified as an important problem. An example of a spatial query may be to determine how many rectangles in a spatial database are contained within a rectangular spatial query of a certain size. For example, a query may be to determine how many lakes are within a state. In that case, the lakes are the data rectangles in the spatial database and the rectangular query is the particular state. Similarly one may wish to know how many houses are in a county or how many restaurants are in an area. It may be beneficial to estimate the results of such a query to determine the most efficient way to execute queries generally or to give users estimates of the running times of their queries before the queries are actually executed.

Some query result estimation techniques have been applied to relational databases. A relational database contains non spatial data such as for example numbers, points (points are a special case and may in some cases be classified as spatial data), strings, and dates. These techniques are disclosed in "Balancing Histogram Optimality and Practicality for Query Result Size Estimation", Yannis E. Ioannidis and Viswanath Poosala, appeared in Proceedings of ACM SIGMOD (Special Interest Group in Management of Data) conference 1995, and use histograms, samples, or are based on parametric techniques. However, relational selectivity estimation solutions focus on approximating single numerical attributes not on two dimensional spatial data.

Generally a bucket is defined as any subset of input spatial data. A spatial input generally can be defined as an input of spatial entities such as rectangles and triangles. Points can be both spatial data and relational data.

SUMMARY OF THE INVENTION

The present invention provides various methods and apparatus for providing accurate estimates for point and range queries over two-dimensional spatial data. The present invention provides several grouping techniques for the approximating of spatial data.

In one embodiment of the present invention a method is disclosed for grouping a plurality of spatial inputs into a plurality of buckets also called grouping polygons. These buckets may be stored in a memory by storing their left bottom corner coordinates and their right top corner coordinates (for a rectangular bucket). This provides both the shape of a rectangular bucket and its location. In one form of the present invention the plurality of spatial inputs is grouped based on an equi-area partitioning technique. The equi-area partitioning technique can use the longest dimension of a bucket or bounding polygon as the criteria for splitting into further buckets or bounding polygons. An equi-count technique can also be used wherein the buckets are split using the highest projected spatial input count along a dimension as a splitting criteria. The bounding polygons may be a minimum bounding rectangle.

In one form of the present invention a method is provided which uses a grid of regions superimposed over a plurality of spatial inputs. The processor may achieve superimposition by storing the left bottom corner coordinates and the right top corner coordinates of the each region of the grid of regions in memory and storing the left bottom corner and right top corner coordinates of each spatial input in memory. Superimposition occurs because the coordinates of a spatial input and a region of the grid of regions may be the same. The method preferably determines a measure of the density of the spatial inputs within each region of the grid of regions and uses this measurement of density to determine how to group the spatial inputs into buckets.

When a query is received the present invention applies the query to the buckets created and gives an estimate of the number of spatial inputs contained within the query by preferably assuming that spatial inputs are uniformly distributed within each bucket.

BRIEF DESCRIPTION OF THE DRAWINGS

FIGS. 12A–12B are diagrams showing progressive refinement in accordance with the present invention;

FIG. 13 shows a distribution of buckets in accordance with the minimum skewing grouping technique of FIG. 11.

DETAILED DESCRIPTION OF THE DRAWINGS

Figure 1:
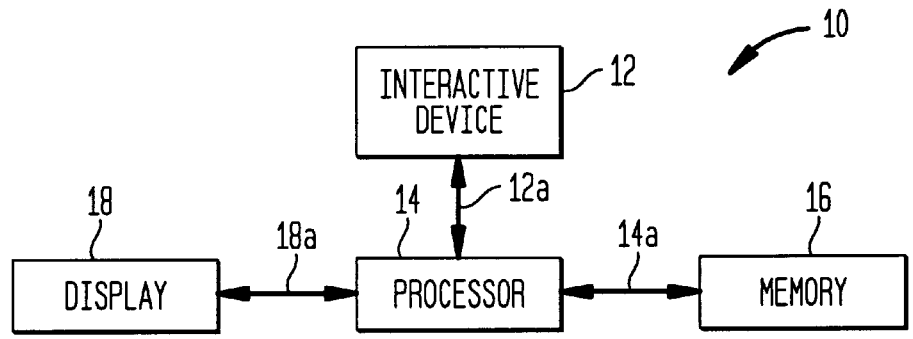
FIG. 1 shows an apparatus in accordance with an embodiment of the present invention.
Figure 2:
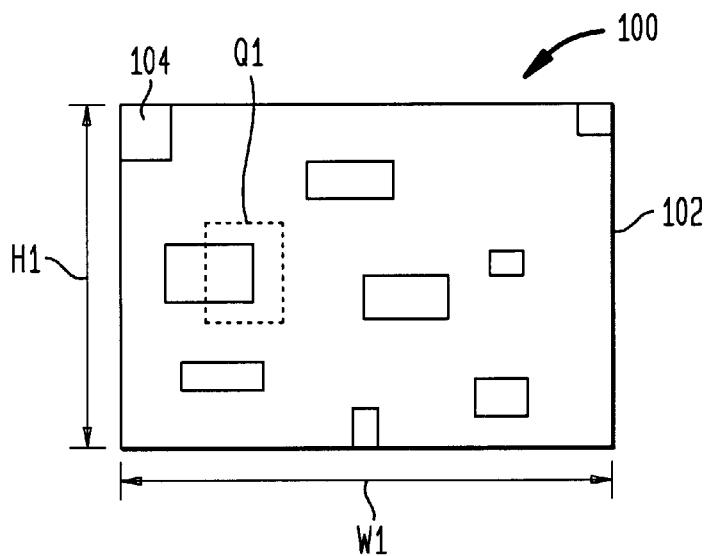
FIG. 2 shows a random spatial distribution of rectangles.
Figure 3:
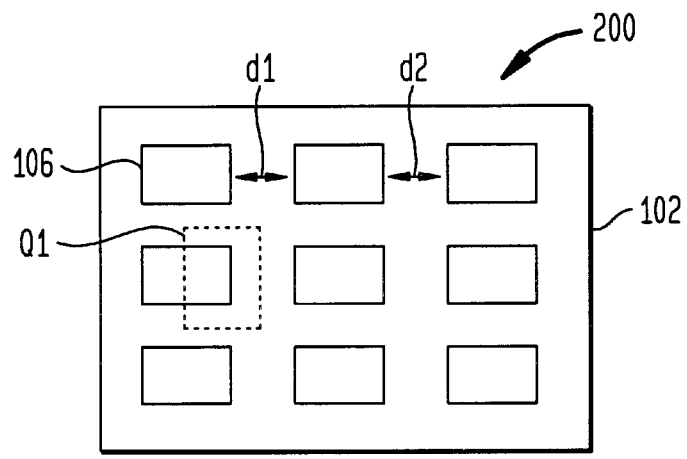
FIG. 3 shows a uniform spatial distribution of rectangles.

FIG. 1 shows an apparatus 10 in accordance with an embodiment of the present invention. The apparatus 10 is comprised of an interactive device 12 connected by a communications link 12a to a processor 14, which is connected by a communications link 14a to a memory 16. Display 18 is connected by communications link 18a to processor 14. The processor 14 acts under the control of a stored computer program which may be stored in its own memory or in memory 16. FIG. 2 shows a random spatial distribution 100 of a plurality of rectangles 104. Also shown in FIG. 2 is the minimum bounding rectangle ("MBR") 102 which has a width W1 and a height H1. The minimum bounding rectangle is the minimum size rectangle which bounds all of the plurality of data rectangles so that all the data rectangles 104 are enclosed within the minimum bounding rectangle. FIG. 3 shows a uniform spatial distribution of rectangles 106. Each rectangle 106 has the same height and width. The MBR 102 is the same as in FIG. 2 (although technically the minimum bounding rectangle 102 is no longer a "minimum bounding" rectangle in FIG. 3). The rectangles 106 are uniformly distributed over the MBR 102 so that the d1 distance (for example) is the same as the d2 distance.

The FIG. 2 distribution 100, for this example, is an actual distribution of rectangular input data. The FIG. 3 uniform distribution 200 is used for estimating the rectangular data in FIG. 2. Q1 shown in both FIG. 2 and FIG. 3 is a query rectangle. In order to determine how many rectangles 104 intersect with the query rectangle Q1, the processor 14 can essentially be programmed by its computer program to implement an assumption that the rectangles 104 are of uniform size (of the size of uniform rectangles 106) and are spread out uniformly over the MBR 102 as shown in FIG. 3. The processor 14 can implement its assumption by estimating the answer to query Q1 by using the number of rectangles 104 (in this case 9), the average width, average height, and average area of all the rectangles 104, and the MBR width and height (W1 and H1). These values can be stored and retrieved from memory 16. The processor 14 thus does not have to know where the rectangles 104 are spatially located to determine the estimated answer to query Q1 or to any other possible query rectangle or query applied to the distribution 100. The assumption implemented by the processor 14 is called the uniformity assumption.

The number of data rectangles intersecting with a query Q1 is equal to:

$$n \times \text{Area}(Q1)/\text{Area (I)}: \quad (1)$$

where n is the number of data rectangles 104 in the "MBR"; Area (Q1) may be an extended area=(qx'2−qx'1) x (qy'2−qy'1); and Area (I) is the area of the minimum bounding rectangle 102 in FIG. 2. For the extended Area (Q1)

$$Q1=[(qx1, qy1), (qx2, qy2)] \quad (2)$$

$$qx'1=\min(x1, (qx1-\text{Wavg})); qx'2 =\min(x2, (qx2-\text{Wavg})) \quad (3)$$

$$qy'1=\min(y1, (qy1-\text{Havg})); qy'2 =\min(q2, (qy2-\text{Havg})) \quad (4)$$

Wavg and Havg are the average width and average height, respectively, of the data rectangles 104 in FIG. 2.

Figure 4:
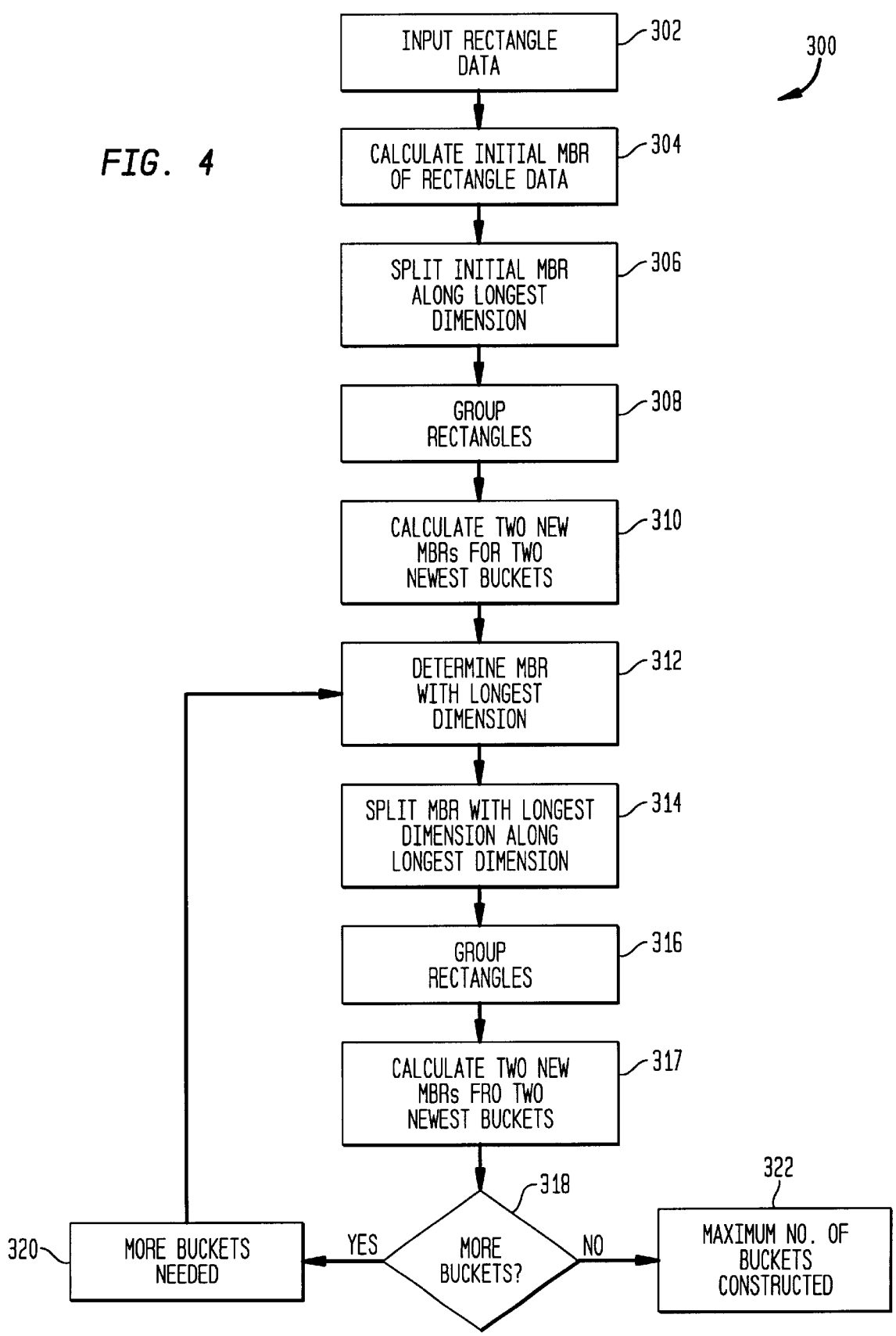
FIG. 4 shows a flow chart for a equi-area spatial grouping technique in accordance with the present invention.
Figure 5:
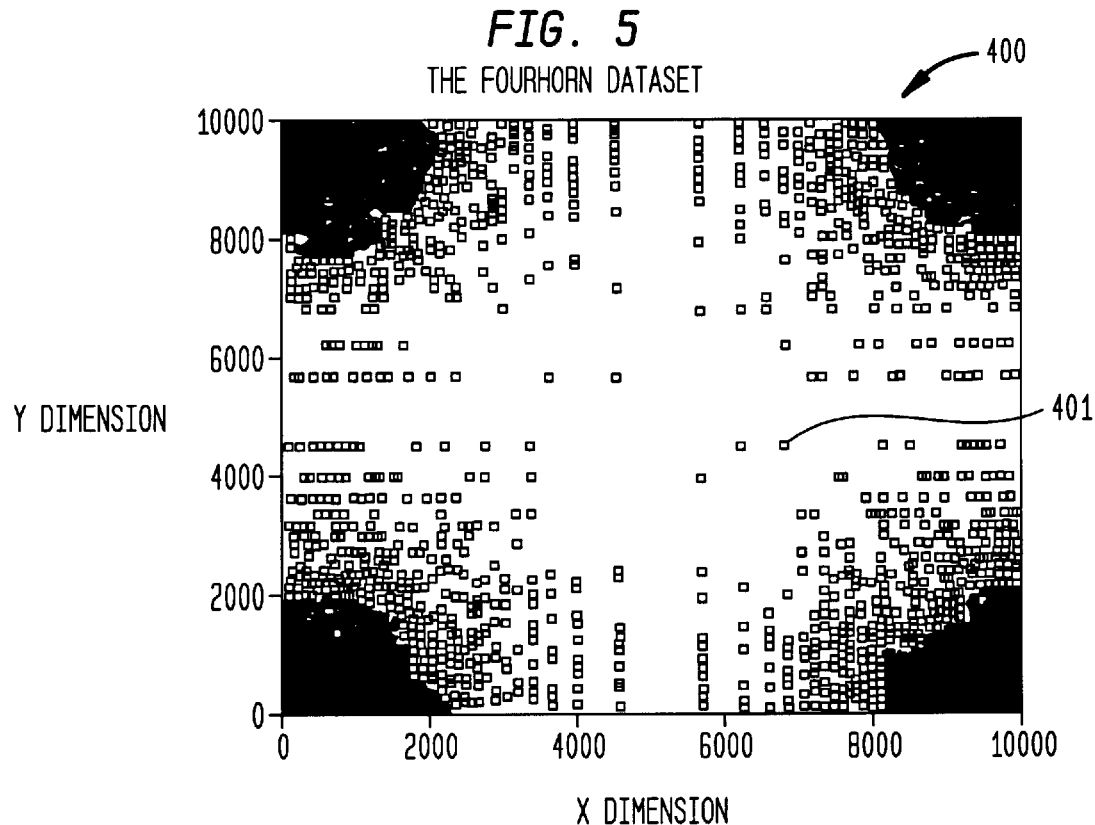
FIG. 5 shows a data distribution of input rectangles.
Figure 6:
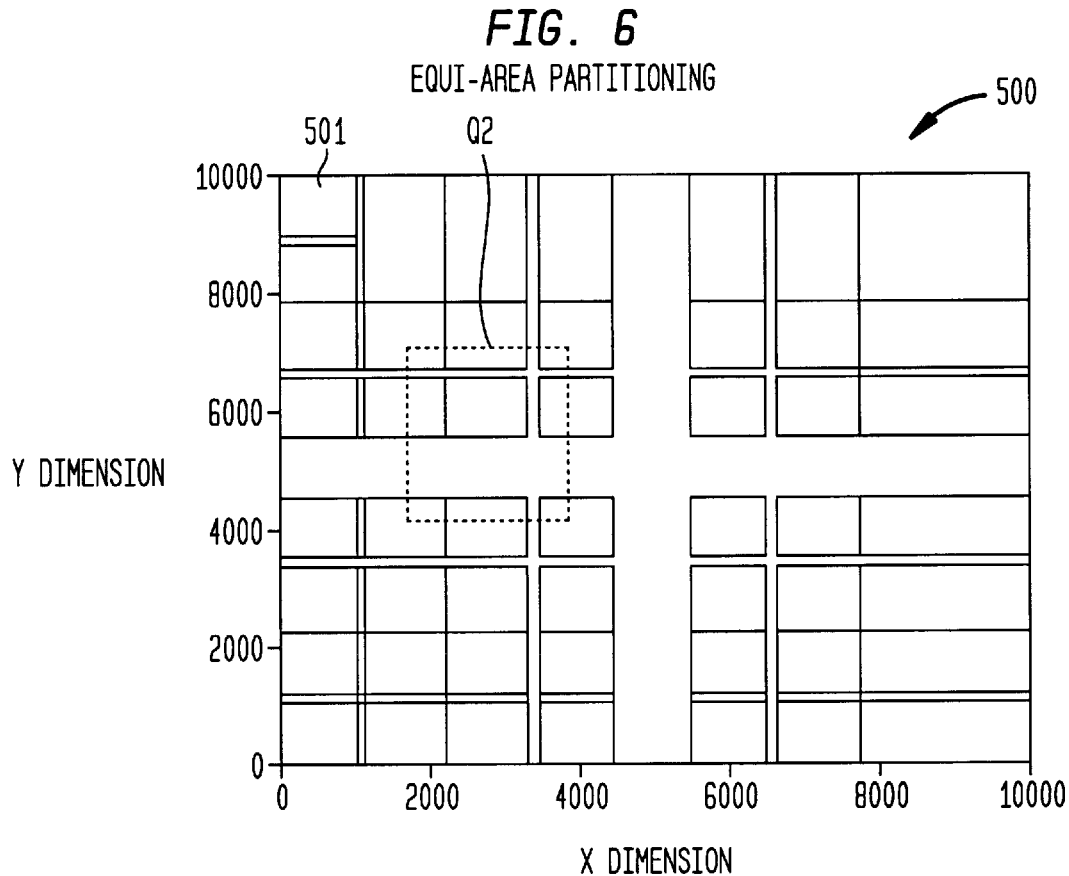
FIG. 6 shows a distribution of buckets in accordance with the equi-area spatial grouping technique of FIG. 4.

FIG. 4 shows a flow chart 300 of a method for an equi-area spatial grouping technique in accordance with the present invention. The method of flow chart 300 can be executed by the processor 14 of FIG. 1. FIG. 5 shows a distribution of input rectangles. The input rectangular data can be input through interactive device 12 and processor 14 and stored in memory 16. The left bottom corner coordinates and right top corner coordinates can be stored in memory 16 to effectively store each input rectangle. This provides location and size information. FIG. 6 shows a distribution of buckets in accordance with the equi-area spatial grouping technique of FIG. 4. The distribution 500 of buckets can be determined by processor 14.

The processor 14 can retrieve input rectangular data, such as the data shown in FIG. 5, from memory 16 at step 302 and calculate the initial Minimum Bounding Rectangle of the rectangular data at step 304 and store the initial MBR in memory 16. The initial MBR and any other bounding rectangle or bounding polygon can be stored in memory 16 by storing its height, width, and its location in memory 16. The initial MBR and any other bounding MBR may be stored in memory 16 by storing its left bottom corner coordinates and its right top corner coordinates. The initial Minimum Bounding Rectangle is split along its longest dimension into first and second buckets at step 306 shown in FIG. 4. The data rectangles, such as data rectangle 401, are then grouped into either the first or the second bucket but not both. The buckets can be thought of as grouping polygons. The grouping polygons or buckets as referred to in this application, may also be stored in memory 16 by storing their height, width, and location. The grouping polygons may also be stored by storing in memory 16 the left bottom corner coordinates and the right top corner coordinates, which gives both location and shape or size information. Each data rectangle preferably is placed in the bucket (or grouping polygon) where its center is located by enlarging the appropriate bucket until the data rectangle is enclosed within the bucket. The MBR for each bucket is then calculated resulting in two new MBRs (one for each bucket) at step 310. The two new MBRs can be thought of as a new MBR and an MBRlast (where "last" is the most recent). If MBRk was split (where k is some number between 1 and the number of buckets previously created) then the new MBR can be used to replace MBRk and MBRlast could be stored as an additional MBR. Thus, where previously there were a plurality of MBRi (with i going from 1 to (last −1)) there are now a plurality of MBRi where i goes from 1 to last) and where one of the previous MBRs was replaced.

The MBR having the longest dimension (width or height) is determined at step 312. That MBR is split into two buckets along the longest dimension at step 314. I.e. with each split one bucket transformed into two new buckets. The two new buckets can be stored in memory 16 by storing their bottom left coordinates and top right coordinates. The data rectangles formerly belonging to the now split MBR are grouped into one or the other of the created buckets at step 316. Data rectangles can be grouped according to where their centers are and the minimum bounding rectangle of the buckets are increased until the entire data rectangles are in the appropriate buckets. The MBR for each bucket is then calculated resulting in two MBRs (one for each bucket) at step 317 which can be stored in memory 16 of FIG. 1 by replacing the just split MBR and adding an additional MBR as previously explained. At step 318 the processor 14 determines if there are any more buckets to create (there may be a limitation of say for example 50 buckets to create). If more buckets are required as determined at step 318 and 320 the processor 14 continues at step 312 to determine the MBR (of the plurality of MBR's created so far) with the longest dimension. The processor 14 continues to perform the operations in steps 312, 314, 316, 317, 318, and 320 until there are an appropriate number of buckets. Step 322 is reached when the maximum number of buckets have been created.

FIG. 6 shows fifty buckets 501 which have been created by equi-area partitioning using the input rectangular data set shown in FIG. 5. FIG. 5 is a distribution 400 of rectangular data of the known FourHorn Data Set. The processor 14 would store the bucket distribution 500 in memory 16. Each bucket 501 would be assumed to have a uniform distribution of data rectangles inside of it. The processor 14 upon receiving a query Q2, would check the query spatially against the buckets 501 in FIG. 6 to determine how many of the buckets Q2 intersects. By knowing how many buckets the query Q2 intersects, knowing the average distribution in each bucket, and assuming uniformity within each bucket, the processor 14 can estimate how many data rectangles 401 the query Q2 intersects. The processor 14 can use the formulas (1) through (4) previously shown on each bucket and then add up the results for all buckets which intersect the query Q2.

Figure 7:
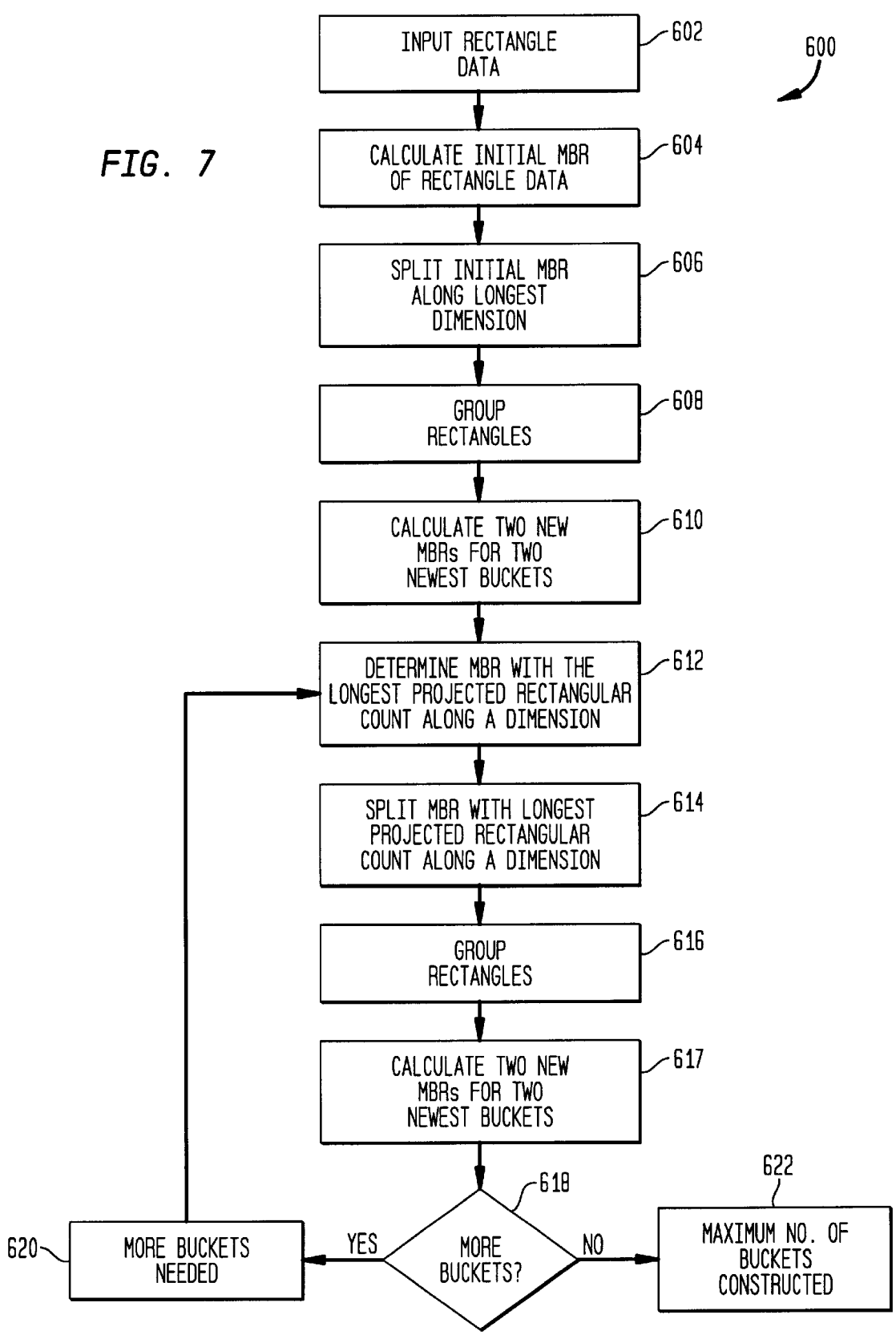
FIG. 7 shows a flow chart for an equi-count spatial grouping technique in accordance with the present invention.
Figure 8:
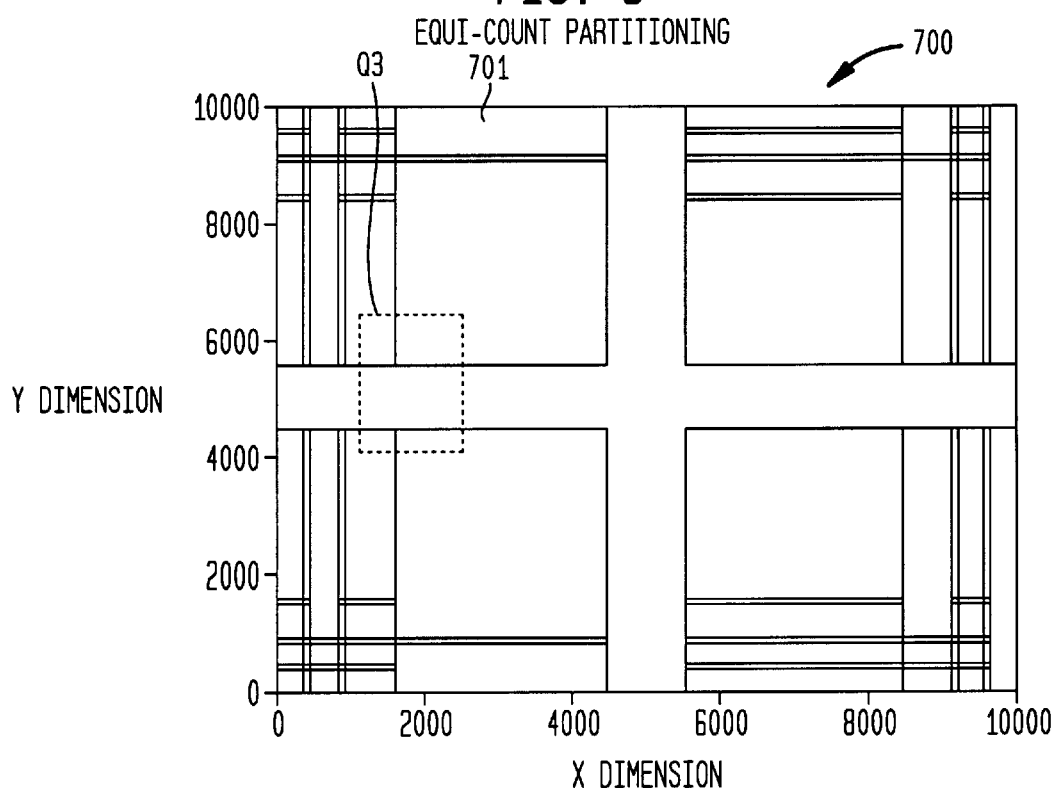
FIG. 8 shows a distribution of buckets in accordance with the equi-area spatial grouping technique of FIG. 7.

FIG. 7 shows a flow chart 600 of a method for an equi-count spatial grouping technique in accordance with the present invention. The method of flow chart 600 can be executed by the processor 14 of FIG. 1. The FIG. 5 distribution of input rectangles will be used for an example of the equi-count technique also. FIG. 8 shows a distribution of buckets in accordance with the equi-count spatial grouping technique of FIG. 7. The distribution 700 of buckets can be determined by processor 14.

The processor 14 can retrieve input rectangular data, such as the data shown in FIG. 5, from memory 16 at step 602 and calculate the initial Minimum Bounding Rectangle of the rectangular data at step 604. The initial Minimum Bounding Rectangle is split along its dimension with the highest projected data rectangle count into first and second buckets at step 606. The data rectangles, such as data rectangle 401 shown in FIG. 5, are then grouped into either the first or the second bucket but not both. Each data rectangle preferably is placed in the bucket where its center is located by enlarging the bucket until the appropriate data rectangle is contained within it. The MBR for each bucket is then calculated resulting in two MBRs (one for each bucket) at step 610 which can be stored in memory 16. One of the new MBRs can replace the split MBR in memory 16 and one of the new MBRs can be stored as a most recent MBR (also called MBR last) as previously described with reference to FIG. 4. The MBR having the dimension with the highest projected data rectangular count is determined at step 612. That MBR is split into two buckets along the longest dimension at step 614. I.e. with each split one bucket transformed into two new buckets. The data rectangles formerly belonging to the now split MBR, are grouped into one or the other of the created buckets at step 616. Data rectangles can be grouped according to where their centers on. Each data rectangle whose center lies in a bucket is placed completely inside the bucket by enlarging the bucket until the data rectangle completely resides in the bucket. The MBR for each bucket is then calculated resulting in two MBRs (one for each bucket) at step 617 which can be stored in memory 16 by storing the bottom left corner coordinates and top right corner coordinates of each bucket. At step 628 the processor 14 determines if there are any more buckets to create (there may be a limitation of say for example 50 buckets to create). If more buckets are required as determined at step 618 and 620 the processor 14 continues at step 612 to determine the MBR with the highest projected rectangle count along a dimension. The processor 14 continues to perform the operations in steps 612, 614, 616, 617, 618, and 620 until there are an appropriate number of buckets. Step 622 is reached when the maximum number of buckets have been created.

The MBR having the dimension with the highest rectangular count along a dimension can be explained as follows. If a first MBR of one bucket has a string of eight non overlapping data rectangles along its height and a second MBR has a string of only two non overlapping data rectangles along its height then (assuming the heights have the greatest rectangular counts for each MBR) the first MBR would have the higher rectangular count. The equi-count technique assigns more buckets to areas of higher concentrations of data rectangles.

FIG. 8 shows fifty buckets 701 which have been created by equi-count partitioning using the input rectangular data set shown in FIG. 5. The processor 14 would store the bucket distribution 700 in memory 16. Each bucket 701 would be assumed to have a uniform distribution of data rectangles inside of it. The processor 14 upon receiving a query Q3 shown in FIG. 8 would check the query spatially against the buckets 701 in FIG. 6 to determine how many of the buckets Q3 intersects. By knowing how many buckets the query Q3 intersects, knowing the average distribution in each bucket, and assuming uniformity within each bucket, the processor 14 can estimate how many data rectangles 401 the query Q3 intersects. The processor 14 can use the formulas (1) through (4) previously shown for query Q1, on each bucket and then add up the results for all buckets which intersect the query Q3.

Figure 9:
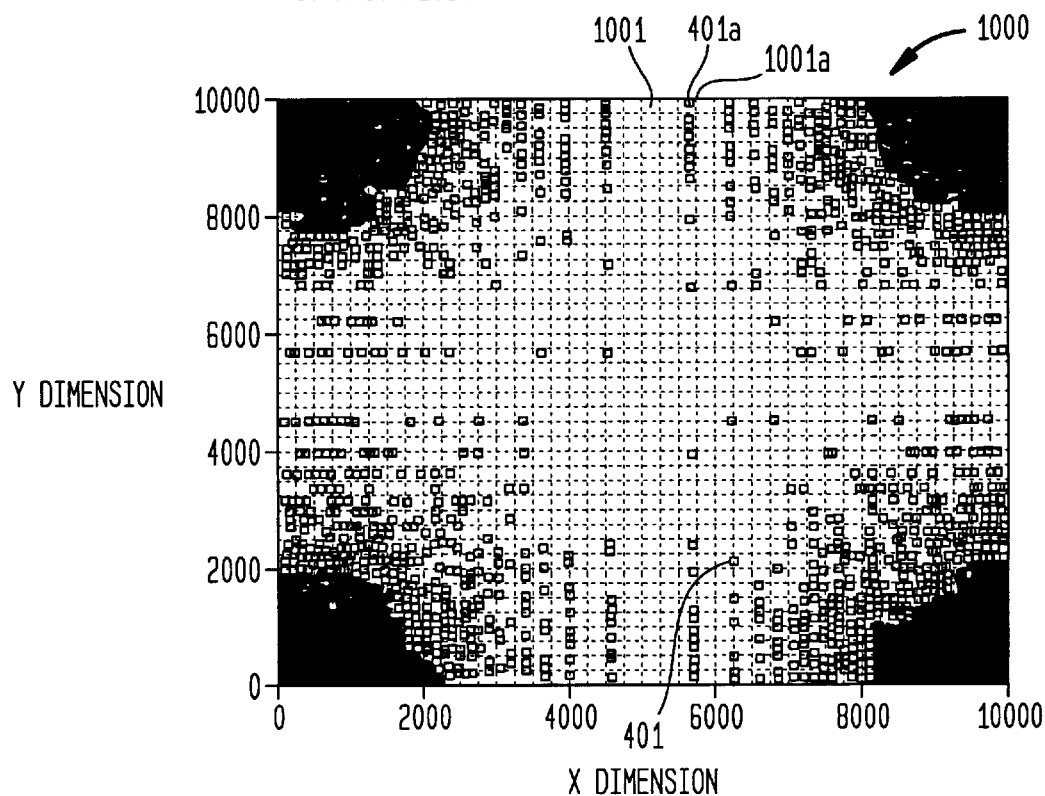
FIG. 9 shows a data distribution of data rectangles on top of a grid of regions.
Figure 10:
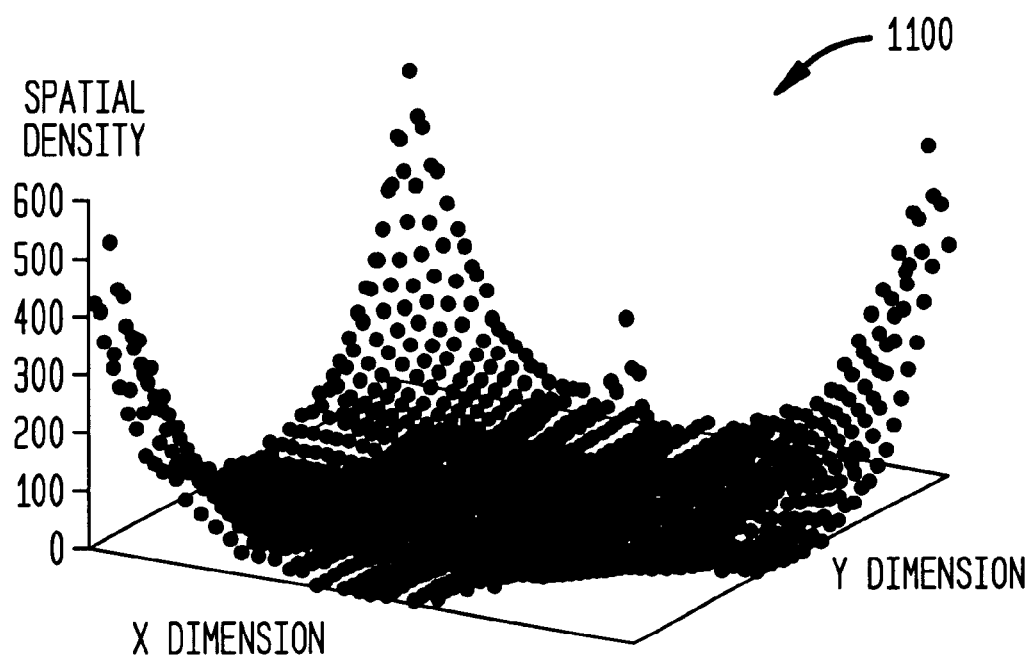
FIG. 10 shows the distribution of spatial densities for each grid region.
Figure 11:
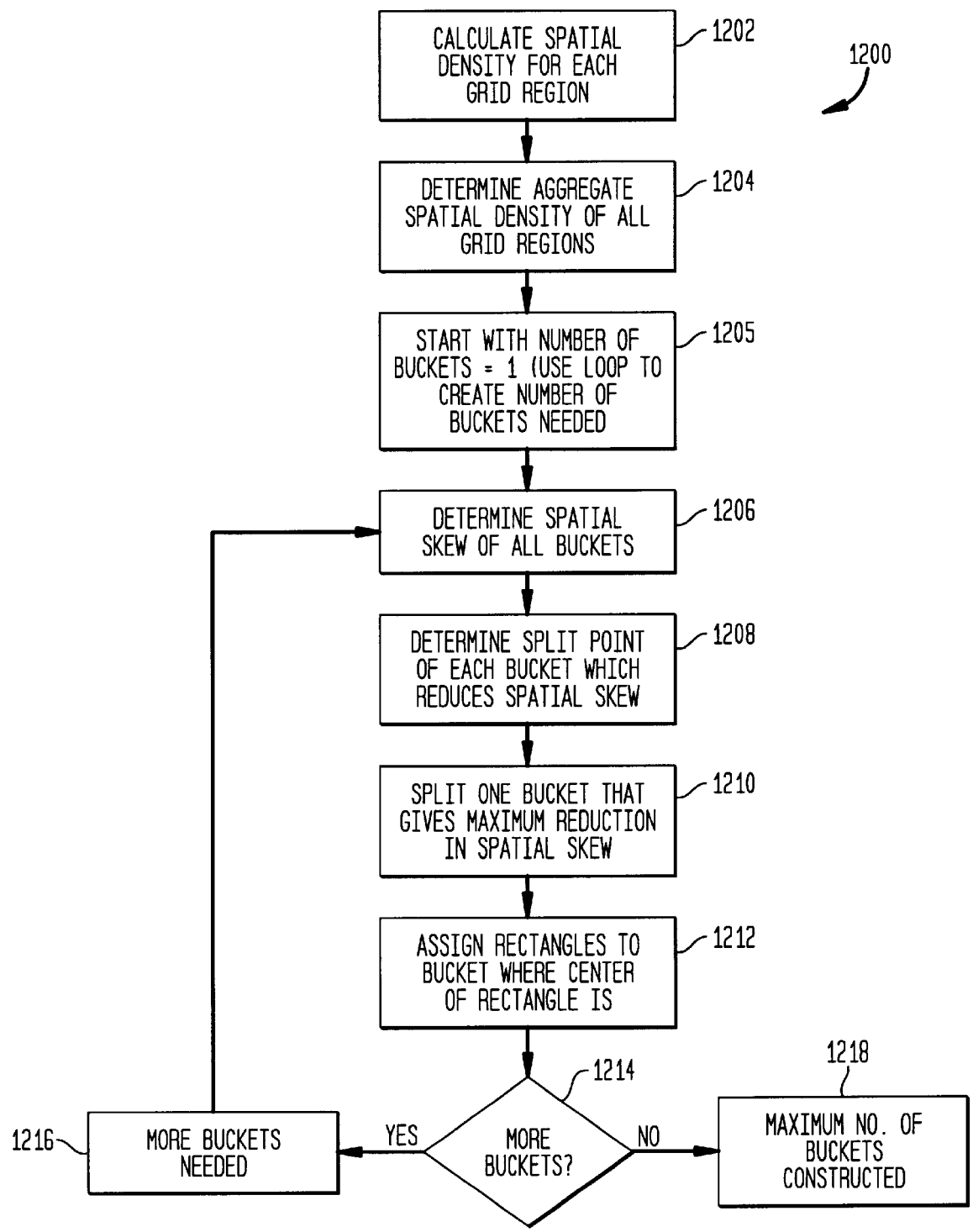
FIG. 11 shows a flow chart for a minimum skewing grouping technique in accordance with the present invention.

FIG. 9 shows a distribution of data rectangles of FIG. 5 on top of a grid 1000 of regions such as region 1001. All the grid regions 1001 are uniform. FIG. 10 shows the distribution 1100 of spatial densities for each grid region 1001. FIG. 11 shows a flow chart 1200 of a method for a minimum skewing grouping technique in accordance with the present invention.

The steps of flow chart 1200 can be executed by a processor, such as processor 14 of FIG. 1. At step 1202 the processor 14 calculates the spatial density for each grid region 1001 on grid 1000 in FIG. 9. The spatial density of each grid region 1001 is defined as the number of input data rectangles, i.e. rectangles 401 in FIG. 9 which intersect with a particular grid region 1001, for example grid region 1001a appears to have one data rectangle 401a intersecting it and therefore would have a spatial density of one. The processor 14 preferably has also data relating to the grid regions 1001 and to the data rectangles 401 stored in memory 16. This may include the left bottom corner coordinates and the right top corner coordinates of each grid region of regions 1001 and each data rectangle of rectangles 401. At step 1204 the processor 14 calculates the aggregate spatial density of all grid regions 1001. At step 1206 the processor 14 calculates the spatial skew of all buckets. For the first pass through flow chart 1200 there will only be one bucket. The spatial skew of a bucket can be defined as the statistical variance of the spatial densities of all points (in this case "points" are grid regions 1001) grouped within that bucket. (Other measurements of variation of the spatial density for the spatial skew could be used.)

> spatial skew=sum $i=1$ to $N$ (spatial density $i$-spatial density ave.)$2/N$ N is the number of grid regions 1001. Spatial Density ave. is the average spatial density for all of the grid regions 1001 in FIG. 9. Spatial Density is the spatial density of a particular grid region such as region 1001a in FIG. 9**.

At step 1208 the processor 14, in response to computer program control, will calculate the split point for each bucket that results in the greatest reduction in spatial skew. At step 1210 the processor 14 will split the bucket that results in the greatest reduction in spatial skew. I.e. while the processor 14 calculates split points for all buckets per pass through steps 1206 through 1210, it only actually splits one bucket per pass through. At step 1212, the processor assigns data rectangles of rectangles 401 to the bucket where the center of the data rectangle is. The processor 14 determines whether more buckets need to be created at step 1214. If more buckets need to be created the steps starting at 1206 through 1214 are executed again. Step 1218 is reached if the maximum number of buckets have been created.

The minimum skew technique is found to out perform the other techniques regardless of the type of distribution of data rectangles.

The minimum skew technique can be improved in some cases by a progressive refinement technique. Assume that the final grid size desired is 16,000 regions in a grid of regions and the number of buckets desired is 60. In this technique, a grid of 16,000/42=1,000 regions would be first used to produce a set of 20 buckets (which is equal to 60 total buckets /(2+1)) by using the min skew technique shown by FIG. 11 After this is done the number of regions can be refined to (for example) 16,000/(41)=4,000 regions and twenty additional buckets would be produced using again the technique shown in FIG. 11. The number of regions can be refined to 16,000 to produce 20 more buckets bringing the total to 60 buckets needed. On the data set shown in FIGS. 5 and 9, this progressive refinement has the following effect. The data rectangles 401 are initially observed coarsely and thus buckets are allocated to cover even relatively less skewed middle areas. This takes care of large sized queries. Towards the end, a large number of regions are produced, which highlights the high skew in the four corners. This causes the Min-skew technique to allocate the remainder of the buckets to those areas. This takes care of small sized queries. In effect, progressive refinement allocates buckets uniformly to the entire space and then selectively drills-down and allocates more buckets to the high-skew regions which require them.

FIGS. 12A and 12B show simple diagrams concerning the progressive refinement technique. In FIG. 12A an area 1300 is shown split into four regions 1301-4. In FIG. 12A, the same area 1300 is shown split into sixteen regions 1310, obtained by splitting each region in FIG. 12A into four regions.

FIG. 13 shows fifty buckets 1401 of a bucket distribution 1400 which have been created by the minimum skewing grouping technique of FIG. 11 using the input rectangular data set shown in FIG. 5. The processor 14 would store the bucket distribution 1400 in memory 16 by storing the bottom left corner and top right corner of each bucket. Each bucket 1401 would be assumed to have a uniform distribution of data rectangles inside of it. The processor 14 upon receiving a query Q5 shown in FIG. 13 would check the query spatially against the buckets 1401 in FIG. 13 to determine how many of the buckets Q5 intersects. By knowing how many buckets the query Q5 intersects, knowing the average distribution in each bucket, and assuming uniformity within each bucket, the processor 14 can estimate how many data rectangles 401 the query Q5 intersects. The processor 14 can use the formulas (1) through (4) previously shown for query Q1, on each bucket and then add up the results for all buckets which intersect the query Q5.

Figure 14A:
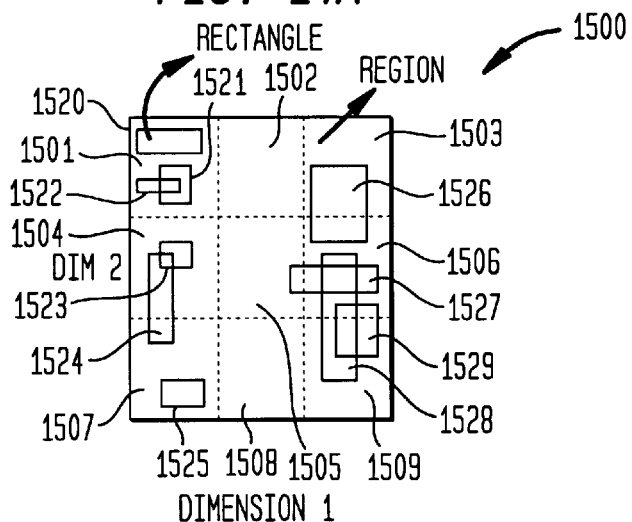
FIGS. 14A–14C illustrates the minimum skewing technique of FIG. 11.
Figure 14B:
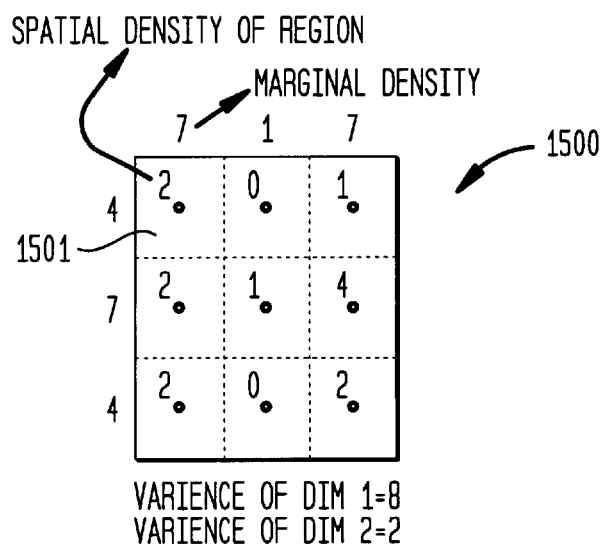
Figure 14C:
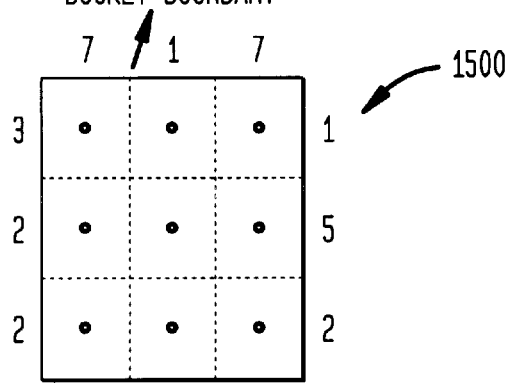

FIGS. 14A–14C illustrates the minimum skewing technique of FIG. 11. FIG. 14A shows an area 1500 which has regions 1501 through 1509. Also shown are data rectangles 1520 through 1528. Each of the regions 1501–1509 has a spatial density equal to the number of data rectangles that intersect the particular region. Data rectangles 1520–22 intersect region 1501 and so that region has a spatial density of 3 as shown in FIG. 14B. FIG. 14B is a graphic chart of spatial densities for the regions 1501–1509. Region 1502 has no data rectangles intersecting it and therefore has a spatial density of zero as shown in FIG. 14B. Region 1503 has data rectangle 1526 intersecting it, and therefore has a spatial density of 1 as shown in FIG. 14B. Region 1504 has data rectangles 1523 and 1524 intersecting it and therefore has a spatial density of 2 as shown in FIG. 14B. Region 1505 has one data rectangle 1527 intersecting it and therefore has a spatial density of 1 as shown in FIG. 14B. Region 1506 has four data rectangles: 1526–29 intersecting it and therefore has a spatial density of 4 as shown in FIG. 14B. Region 1507 has one data rectangle 1525 intersecting it and therefore has a spatial density of 1 as shown in FIG. 14B. Region 1508 has a spatial density of 0. Region 1509 has two data rectangles 1528 and 1529 intersecting it and therefore has a spatial density of 2 as shown in FIG. 14B. At the bottom of FIG. 14B the variances of spatial density along each dimension are shown. Since dimension one has the highest variance, it is chosen for splitting and the resulting bucket boundary 1540 is displayed in FIG. 14C.

We claim:

1. A method for grouping a plurality of spatial inputs comprising the steps of:

receiving a plurality of spatial inputs;

superimposing a grid of regions over the plurality of spatial inputs;

determining a spatial density of each region of the grid of regions which is a measure of the density of the spatial inputs in each region;

determining an aggregate spatial density of all the regions of the grid of regions;

grouping the spatial inputs into a first bucket;

splitting the first bucket along a first split point to create second and third buckets whose total spatial skew is less than or equal to the spatial skew of the first bucket, wherein spatial skew is a measurement of the variation of the spatial densities of each grid region within a bucket, the difference between the spatial skew of the first bucket and the total spatial skew of the second and third buckets being the first spatial skew difference;

determining a second split point for the second bucket, along a dimension of the second bucket that creates first and second subbuckets of the second bucket, whose total spatial skew is less than or equal to the spatial skew of the second bucket;

determining a second spatial skew difference between the total spatial skew for the first and second subbuckets of the second bucket and the spatial skew of the second bucket;

determining a third split point for the third bucket, along a dimension of the third bucket that creates first and second subbuckets of the third bucket, whose total spatial skew is less than or equal to the spatial skew of the third bucket; determining a third spatial skew difference between the total spatial skew for the first and second subbuckets of the third bucket and the spatial skew of the third bucket;

splitting the second bucket along its second split point to form fourth and fifth buckets if the second spatial skew difference is greater than the third spatial skew difference; and splitting the third bucket along its third split point to form fourth and fifth buckets if the third spatial skew difference is greater than the second spatial skew difference.

2. The method of claim 1 and further comprising the steps of:

determining split points for a first set of buckets comprised of the fourth and fifth buckets, and the non-split bucket of the second and third buckets, wherein splitting along each split point creates first and second subbuckets whose total spatial skew is less than the respective bucket;

determining a spatial skew difference between a total spatial skew for first and second subbuckets of each bucket of the first set of buckets, and the spatial skew of the respective bucket;

splitting the one of the first set of buckets along its appropriate split point which gives the greatest spatial skew difference.

3. The method of claim 1 and wherein:
the spatial inputs are polygons.

4. The method of claim 1 and wherein:
the spatial inputs are rectangles.

5. The method of claim 1 and wherein:
each grid region is a rectangular grid region.

6. The method of claim 1 and wherein:
the spatial density of each region is approximately equal to the number of spatial inputs which intersect each region of the grid of regions.

7. The method of claim 1 and wherein:
the spatial density of each region is approximately equal to the number of spatial inputs whose centers are located in each region of the grid of regions.

8. The method of claim 1 and wherein:
the measure of variation of the spatial densities of each grid region within each bucket is the statistical variance of the spatial densities of each grid region within each bucket.

9. The method of claim 1 and wherein:
a split point for a bucket is approximately the optimal split point wherein first and second subbuckets are created so that the total spatial skew for the first and second subbuckets of a bucket is less than the spatial skew for the appropriate bucket and the difference between the total spatial skew for the subbuckets of a bucket and the spatial skew of the appropriate bucket is approximately the maximum possible difference for any possible split of the appropriate bucket.

10. An apparatus comprised of:

a processor;

and a memory which is connected by a communications link to the processor; the memory storing a computer program code wherein the processor operates in accordance with the computer program code;

wherein the processor:

receives a plurality of spatial inputs;

superimposes a grid of regions over the plurality of spatial inputs;

determines a spatial density of each region of the grid of regions which is a measure of the density of the spatial inputs in each region;

determines an aggregate spatial density of all the regions of the grid of regions;

groups the spatial inputs into a first bucket;

splits the first bucket along a first split point to create second and third buckets whose total spatial skew is less than or equal to the spatial skew of the first bucket, wherein spatial skew is a measurement of the variation of the spatial densities of each grid region within a bucket, the difference between the spatial skew of the first bucket and the total spatial skew of the second and third buckets being the first spatial skew difference;

determines a second split point for the second bucket, along a dimension of the second bucket that creates first and second subbuckets of the second bucket, whose total spatial skew is less than or equal to the spatial skew of the second bucket;

determines a second spatial skew difference between the total spatial skew for the first and second subbuckets of the second bucket and the spatial skew of the second bucket;

determines a third split point for the third bucket, along a dimension of the third bucket that creates first and second subbuckets of the third bucket, whose total spatial skew is less than or equal to the spatial skew of the third bucket;

determines a third spatial skew difference between the total spatial skew for the first and second subbuckets of the third bucket and the spatial skew of the third bucket;

splits the second bucket along its second split point to form fourth and fifth buckets if the second spatial skew difference is greater than the third spatial skew difference; and splits the third bucket along its third split point to form fourth and fifth buckets if the third spatial skew difference is greater than the second spatial skew difference.

* * * * *